United States Patent
Aoki et al.

(10) Patent No.: US 9,319,669 B2
(45) Date of Patent: Apr. 19, 2016

(54) IMAGE PROCESSING DEVICE AND IMAGE PROCESSING METHOD

(71) Applicant: FUJITSU LIMITED, Kawasaki-shi, Kanagawa (JP)

(72) Inventors: Yasuhiro Aoki, Kawasaki (JP); Masami Mizutani, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/167,620

(22) Filed: Jan. 29, 2014

(65) Prior Publication Data

US 2014/0313349 A1    Oct. 23, 2014

(30) Foreign Application Priority Data

Apr. 22, 2013   (JP) ................. 2013-089853

(51) Int. Cl.
*G06K 9/00*     (2006.01)
*H04N 17/00*    (2006.01)
*G06T 11/00*    (2006.01)
*G06T 7/40*     (2006.01)
*G06K 9/46*     (2006.01)
*G06T 9/00*     (2006.01)
*G06T 7/00*     (2006.01)

(52) U.S. Cl.
CPC ............ *H04N 17/002* (2013.01); *G06K 9/4652* (2013.01); *G06T 7/0081* (2013.01); *G06T 7/408* (2013.01); *G06T 9/005* (2013.01); *G06T 11/001* (2013.01)

(58) Field of Classification Search
CPC .... G06K 9/4652; G06T 11/001; G06T 7/408; G06T 7/0081; G06T 9/005

USPC ................ 382/165, 168, 162, 166, 167, 169; 348/187

See application file for complete search history.

(56) References Cited

U.S. PATENT DOCUMENTS

| | | | |
|---|---|---|---|
| 2011/0199491 A1 | 8/2011 | Jikihira et al. | |
| 2012/0121127 A1* | 5/2012 | Aoki | G06T 7/0044 382/103 |
| 2012/0203371 A1* | 8/2012 | Hsu | H04N 1/644 700/138 |
| 2013/0108155 A1* | 5/2013 | Mizutani et al. | 382/165 |

FOREIGN PATENT DOCUMENTS

| | | |
|---|---|---|
| JP | 2010-87743 | 4/2010 |
| JP | 2010-107348 | 5/2010 |

(Continued)

*Primary Examiner* — Jefferey Harold
*Assistant Examiner* — Omer Khalid
(74) *Attorney, Agent, or Firm* — Staas & Halsey LLP

(57) ABSTRACT

An image processing device includes a processor; and a memory which stores a plurality of instructions, which when executed by the processor, cause the processor to execute, acquiring an image that includes a marker that includes a plurality of first color regions and a plurality of second color regions, of which a color is different from a color of the first color regions, the plurality of first color regions being opposed to each other and the plurality of second color regions being opposed to each other; extracting the first color regions or the second color regions from the image; reducing the first color regions or the second color regions until a first degree of similarity between a shape of the first color regions or the second color regions, the first color regions or the second color regions being extracted, and a predetermined elliptical shape satisfies a predetermined first threshold value.

11 Claims, 10 Drawing Sheets

(56) References Cited

FOREIGN PATENT DOCUMENTS

| WO | WO 2010/050412 A1 | 5/2010 |
| WO | WO 2012/001793 A1 | 1/2012 |
| WO | WO 2012/061205 A1 | 5/2012 |

* cited by examiner

○    :FIRST COLOR REGION
●    :SECOND COLOR REGION
⊘    :GRAVITY CENTER POSITION
—·—  :FIRST LINE SEGMENT
----  :SECOND LINE SEGMENT

IMAGE PROCESSING DEVICE AND IMAGE PROCESSING METHOD

CROSS-REFERENCE TO RELATED APPLICATION

This application is based upon and claims the benefit of priority of the prior Japanese Patent Application No. 2013-089853, filed on Apr. 22, 2013, the entire contents of which are incorporated herein by reference.

FIELD

The embodiments discussed herein are related to an image processing device, an image processing method, and an image processing program which are utilized for camera calibration processing for calculation of a position and a posture of a camera and is used for extraction of a coordinate of a marker on a picked-up image, for example.

BACKGROUND

Such technique has been proposed that a surrounding image of driver's own vehicle is acquired by a camera and the acquired image is presented to the driver so as to assist the driver in checking a surrounding situation of the driver's own vehicle and thus contribute to the driver's safe driving. For example, a plurality of cameras are provided around a driver's own vehicle and images which are picked up by respective cameras are synthesized, enabling the driver to visually recognize a wide-ranging image of the surroundings of the driver's own vehicle.

A plurality of cameras have to be installed on predetermined positions and in predetermined camera-directions so as to obtain an image which provides no feeling of strangeness to a driver, that is, a synthesis image in which no seams of images are out of alignment or images are not inclined, as a result of synchronization of a plurality of picked-up images. However, cameras are attached on a vehicle, so that installation positions and angles of the cameras may change due to vibration caused by moving of the vehicle and the like. Therefore, whether or not a gap is generated on installation positions and angles of the cameras has to be confirmed at arbitrary timing after start of use such as shipping and vehicle inspection, and thus calibration processing of the installation positions and angles of the cameras has to be performed.

In the calibration processing of installation positions and angles of cameras, a marker (jig) which is installed on a prescribed position in a camera shooting range is shot and a marker position on the shot image, in other words, a coordinate of a feature point of the marker on a picked-up image is associated with a prescribed position. As a marker used for the calibration processing, a marker which has a pattern of which a feature point is easily extracted on a picked-up image is preferably used. For example, a checkered marker is generally used. Here, in a checkered marker, a central point of an intersection of a checkered pattern is extracted as a feature point, for example.

As a method for extracting a feature point of a checkered marker, such technique has been disclosed that a color boundary line of color regions which constitute a checkered pattern on a picked-up image is detected and an intersecting point is obtained by using the detected color boundary line so as to extract a feature point of a marker, in Japanese Laid-open Patent Publication No. 2010-87743.

SUMMARY

According to an aspect of the invention, in accordance with an aspect of the embodiments, an image processing device includes a processor; and a memory which stores a plurality of instructions, which when executed by the processor, cause the processor to execute, acquiring an image that includes a marker that includes a plurality of first color regions and a plurality of second color regions, of which a color is different from a color of the first color regions, the plurality of first color regions being opposed to each other and the plurality of second color regions being opposed to each other; extracting the first color regions or the second color regions from the image; reducing the first color regions or the second color regions until a first degree of similarity between a shape of the first color regions or the second color regions, the first color regions or the second color regions being extracted, and a predetermined elliptical shape satisfies a predetermined first threshold value; and calculating a second degree of similarity between the first color regions or the second color regions, the first color regions or the second color regions satisfying the first threshold value, and a predetermined butterfly shape.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

These and/or other aspects and advantages will become apparent and more readily appreciated from the following description of the embodiments, taken in conjunction with the accompanying drawing of which.

DESCRIPTION OF EMBODIMENTS

Figure 1A:
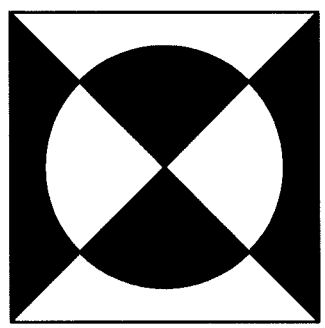
FIG. 1A illustrates a first example of a marker.
Figure 1B:
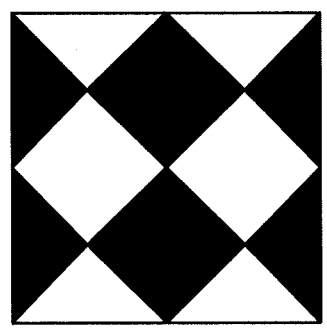
FIG. 1B illustrates a second example of a marker.
Figure 1C:
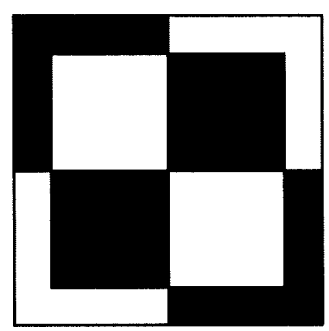
FIG. 1C illustrates a third example of a marker.

FIG. 1A illustrates a first example of a marker. FIG. 1B illustrates a second example of a marker. FIG. 1C illustrates a third example of a marker. Markers in FIGS. 1A to 1C have a checkered pattern. As illustrated in FIG. 1A, the marker has a circular region on a central portion of a square region of approximately 40 centimeters, for example. Further, as illustrated in FIGS. 1B and 1C, the markers further have a square region on a central portion of the square region of approximately 40 centimeters, for example.

In FIGS. 1A to 1C, the marker includes a plurality of first color regions and a plurality of second color regions of which a color is different from that of the first color regions and the first color regions and the second color regions are respectively opposed to each other. In other words, the marker has a checkered pattern in which white regions and black regions are alternately arranged, for example. Further, the circular region or the square region which is positioned on a central portion of the marker has a pair of white regions which are opposed to each other and a pair of black regions which are opposed to each other across the central portion of the marker. Here, the marker is set to have a black-and-white checkered pattern, for example, so as to extract a center of the circular region or the square region of the marker as a feature point, for example. Description is provided by taking the marker illustrated in FIG. 1A as an example in this embodiment, but the marker illustrated in FIG. 1B or FIG. 1C is also applicable. Further, in the description, the first color regions correspond to white regions and the second color regions correspond to black regions for the sake of convenience of the description, but associating relation may be prescribed in an opposite manner.

Through diligent verification of the inventors, the following problems have emerged in an image processing device which extracts a feature point of a marker from a blurred image. For example, an image processing device which extracts a feature point of a marker even in a blurred image has been disclosed in International Publication Pamphlet No. WO 2012/061205. In this image processing device, it is focused that a feature point of a marker is an intersecting point between a pair of white regions and a pair of black regions of a marker having a checkered pattern. A method in which color regions of a marker are extracted so as to extract a feature point of the marker on the basis of positional relation of the extracted color regions has been disclosed.

As described above, an influence of a lighting environment in execution of calibration processing causes such shooting that one color regions of a marker are expanded and the other color regions are degenerated. Accordingly, a marker of a picked-up image may appear on the picked-up image in a state that one color regions are eroded (may be referred to as a linked state). In the image processing device disclosed in International Publication Pamphlet No. WO 2012/061205, it is disclosed that determination of similarity to a predetermined convex shape (elliptical shape) is performed with respect to candidate regions of color regions which constitute a marker, so as to separate an eroded region and degeneration processing is executed when there is no similarity to the predetermined convex shape. Specifically, this image processing device calculates a pseudo elliptical shape from candidate regions of color regions which constitute a marker, for example. The image processing device compares the elliptical area with areas of the candidate regions and determines as a convex shape (elliptical shape) in a case of a high degree of similarity of areas, so as to specify color regions (a pair of white regions and a pair of black regions) which constitute a marker.

Figure 2A:
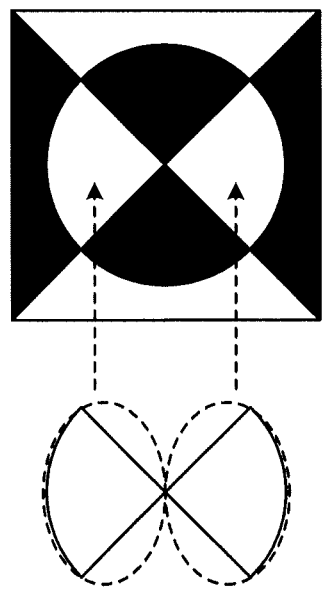
FIG. 2A is a conceptual diagram illustrating a case in which color regions which constitute a marker are correctly recognized.
Figure 2B:
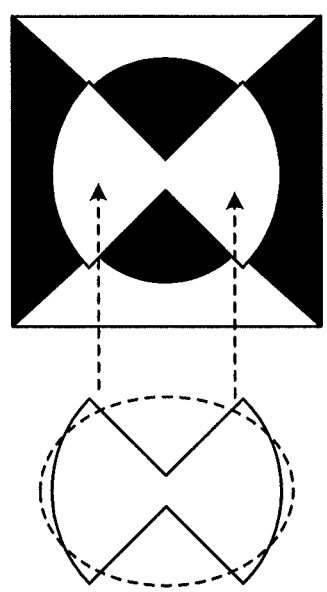
FIG. 2B is a conceptual diagram illustrating a case in which color regions which constitute a marker are erroneously recognized.

However, through diligent verification of the inventors, it has become clear that candidate regions of color regions which constitute a marker, which is observed on a picked-up image, are observed not as an elliptical shape but as a butterfly shape when one type of color regions are eroded in a certain size in the marker of the picked-up image. FIG. 2A is a conceptual diagram of a case in which color regions which constitute a marker are correctly recognized. FIG. 2B is conceptual diagram of a case in which color regions which constitute a marker are erroneously recognized. As illustrated in FIG. 2A, in a case in which erosion is not generated in color regions, it is determined that color regions (for example, white regions) which constitute a marker have an elliptical shape, being able to recognize a pair of white regions which constitute the marker.

On the other hand, as illustrated in FIG. 2B, in a case in which erosion is generated in color regions (for example, in a case in which lighting is strong and bright), a pair of white regions which constitute a marker are joined with each other to form a butterfly shape. It has become clear that there is such problem that it is difficult to specify a pair of white regions which constitute a marker because a degree of similarity of areas in such butterfly shape may satisfy a condition in comparison between an area of the above-mentioned elliptical shape and areas of candidate regions and therefore degeneration processing is not executed.

The inventors have examined setting of a determination condition of similarity with respect to a predetermined elliptical shape to a stricter determination condition so as to be able to exclude a butterfly shape. However, it has become clear that robustness is influenced when a determination condition is set to be stricter in a blurred image. For example, in a case of comparison using areas as a determination condition, it is thinkable to set a threshold value for similarity determination higher. However, in a case of a blurred image, a checkered marker itself is picked up in a distorted manner, causing such problem that a threshold value is not satisfied even if color regions which constitute a marker are separated from each other. Further, the inventors have also examined similarity determination by preparing a butterfly-shaped template, but it has become clear that it is also difficult to apply a template because a butterfly shape is variously imaged in a blurred image.

With the view of above-described limitation, an image processing device which extracts a feature point of a marker with high precision even in a case in which white regions in a pair which constitute a marker are mutually joined to form a butterfly shape in a blurred image as illustrated in FIG. 2B is disclosed in embodiments of the present disclosure.

An image processing device, an image processing method, and an image processing program according to one embodiment are described below in detail with reference to the accompanying drawings. Here, this embodiment does not limit the disclosed technique.

(Embodiment 1)

Figure 3:
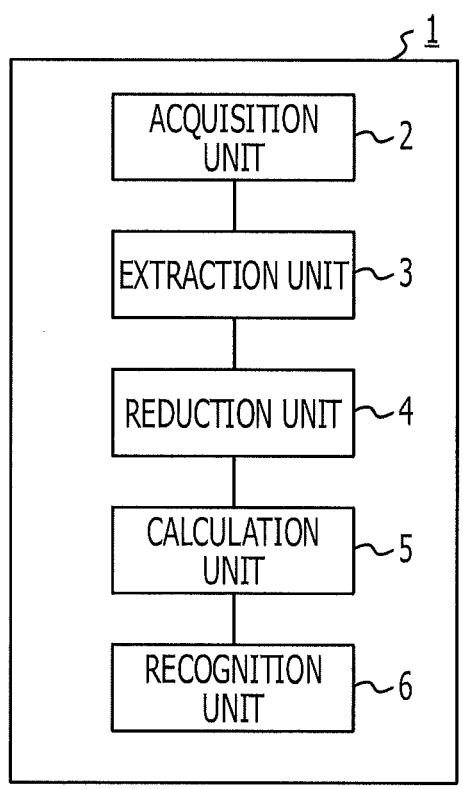
FIG. 3 is a functional block diagram illustrating an image processing device according to one embodiment.

FIG. 3 is a functional block diagram of an image processing device 1 according to one embodiment. The image processing device 1 includes an acquisition unit 2, an extraction unit 3, a reduction unit 4, a calculation unit 5, and a recognition unit 6. Here, the image processing device 1 includes a communication unit, which is not illustrated, and is capable of using a network resource by performing bidirectional data transmission/reception with various external devices via a communication line.

The acquisition unit 2 is a hardware circuit based on a wired logic, for example. Further, the acquisition unit 2 may be a functional module which is realized by a computer program which is executed in the image processing device 1. The acquisition unit 2 receives an image picked up by an external device. The external device which picks up an image is an imaging element, for example. The imaging element is an imaging device such as a charge coupled device (CCD) and a complementary metal oxide semiconductor (CMOS) camera, for example. Here, the imaging element may be included in the image processing device 1 as appropriate. The imaging element images a marker having a checkered pattern, for example. The acquisition unit 2 outputs an image including an acquired marker to the extraction unit 3.

Figure 4:
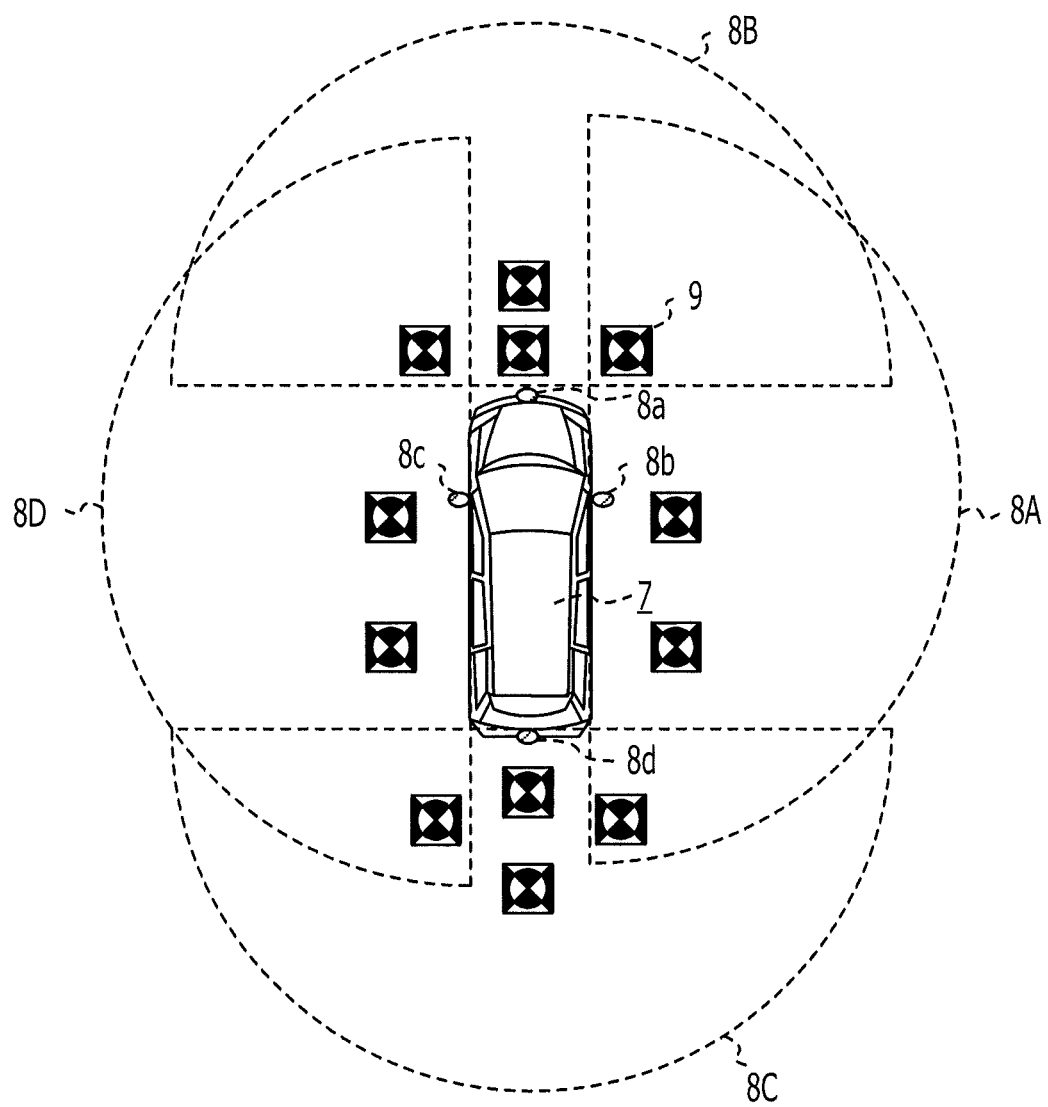
FIG. 4 illustrates an example of an arrangement state of markers.

FIG. 4 illustrates an example of an arrangement state of markers. As illustrated in FIG. 4, a plurality of imaging elements 8a to 8d are installed on positions on which imaging of entire circumference of a vehicle 7 is enabled, for example, with respect to the vehicle 7. Here, 8A to 8D illustrated in FIG. 4 correspond to shooting ranges of the imaging elements 8a to 8d which are installed on the vehicle 7. As illustrated in FIG. 4, a part of the shooting range 8A of the imaging element 8a, a part of the shooting range 8B of the imaging element 8b, and a part of the shooting range 8C of the imaging element 8c are overlapped with each other. Further, a part of the shooting range 8D of the imaging element 8d, a part of the shooting range 8B of the imaging element 8b, and a part of the shooting range 8C of the imaging element 8c are overlapped with each other.

In FIG. 4, the vehicle 7 stops at a predetermined stopping position. Then, respective imaging elements 8a to 8d which are installed on the vehicle 7 arrange markers 9 in the periphery of the vehicle 7 so as to enable shooting of at least four markers, for example. In this case, the markers 9 may be arranged so that two markers 9 which are shot by certain imaging elements among the four markers 9 are shot also by an adjacent imaging element. For example, the markers 9 may be arranged so that one marker 9 which is shot by the imaging element 8a among the four markers 9 is shot by the imaging element 8b which is adjacent to the imaging element 8a.

Further, the markers 9 may be arranged so that one marker 9 which is shot by the imaging element 8a among the four markers 9 is shot by the imaging element 8c which is adjacent to the imaging element 8a. In other words, it is sufficient to arrange the markers 9 on positions on which shooting ranges of a plurality of imaging elements are overlapped with each other. However, it is assumed that physical arrangement positions of the markers 9 with respect to the vehicle 7, with the inclusion of overlapped positions, are preliminarily measured. Here, the numbers of imaging elements and markers 9 may be one, so that description is provided on the assumption that the numbers of imaging elements and markers 9 are one in embodiment 1. In the following description, a reference numeral of the marker 9 is omitted for the sake of convenience of the description.

The extraction unit 3 of FIG. 3 is a hardware circuit based on the wired logic, for example. Further, the extraction unit 3 may be a functional module which is realized by a computer program which is executed in the image processing device 1. The extraction unit 3 receives an image from the acquisition unit 2 and extracts first color regions or second color regions from the image. Specifically, the extraction unit 3 first changes luminance of an image (for example, an original image of RGB colors), in which a marker received from the acquisition unit 2 is included, in accordance with the following formula so as to transform the image into a grayscale image.

$$I(x,y)=0.299R(x,y)+0.587G(x,y)+0.114B(x,y) \quad (1)$$

Here, in formula 1 above, (x, y) denotes a position of the original image (an origin may be on the upper left end of the image, for example). R(x, y), G(x, y), and B(x, y) respectively denote an R component value, a G component value, and a B component value on the position (x, y) of the original image.

Subsequently, the extraction unit 3 generates binary images from the grayscale image respectively. The extraction unit 3 compares a pixel value of a grayscale image with a predetermined threshold value, for example, and performs binarization such that a value equal to or larger than the threshold value is set to "1" and a pixel value smaller than the threshold value is set to "0", so as to generate a binary image from the grayscale image. For example, a candidate of a white region in a checkered pattern is set to "1" and a candidate of a black region is set to "0". Here, the above-mentioned predetermined threshold value does not have to be a fixed value but may be locally determined or dynamically determined in a large sense on the basis of an object image. As a method of related art, there are Otsu's discrimination method, NiBlack's method, and the like, for example.

The extraction unit 3 performs labeling with respect to the binarized image obtained through the binarization so as to extract first color regions and second color regions (in other words, white regions or black regions). Here, as the labeling method, 4 linkage (4 neighborhood) method or 8 linkage (8 neighborhood) method which is a method of related art may be used, for example. Here, the extraction unit 3 may be provided with an image buffer which stores an extraction result and is not illustrated. The image buffer is an image having the same size as the above-mentioned binarized image and is initialized by a white color (1) or a black color (0), for example. Here, the image buffer may be provided to the reduction unit 4 or the like instead of the extraction unit 3. The extraction unit 3 outputs the extracted first color regions and second color regions to the reduction unit 4.

The reduction unit 4 receives the first color regions and the second color regions which are extracted by the extraction unit 3 from the extraction unit 3. The reduction unit 4 calculates a first degree of similarity between shapes of the first color regions and the second color regions and a predetermined elliptical shape. Here, a method for processing the first color regions (white regions) is described as the following processing. It is possible to process the second color regions (black regions) as well in a similar manner to the first color regions by performing black-white inverting processing, for example, so that detailed description is omitted.

The reduction unit 4 determines whether or not each of a plurality of first color regions which are included in the binarized image has an elliptical shape. Specifically, the reduction unit 4 first calculates a long axis and a short axis of a pseudo ellipse which corresponds to the first color regions which are extracted by the labeling, through the following procedure.

When a binarized image on a position (x, y) of a binarized image is set to be BW(x, y) and determination processing is executed for an arbitrary first color region of a plurality of first color regions which are included in the binarized image, a moment $M_{ij}$ of the first color region is defined by the following formula.

$$M_{ij}=\Sigma_{x,y}x^{i}y^{j}BW(x,y) \quad (2)$$

In above formula 2, the moment $M_{ij}$ is referred also to as (i+j)-order moment. Here, a 0-order moment expressed by the following formula is an area of the first color region.

$$M_{00}=\Sigma_{x,y}x^{0}y^{0}BW(x,y)=\Sigma_{x,y}(x,y) \quad (3)$$

It is possible to calculate a coordinate of a gravity center $(x_G, y_G)$ of the first color region on the basis of above formula 2 and formula 3.

$$x_G = \frac{M_{10}}{M_{00}} \quad (4)$$

$$y_G = \frac{M_{01}}{M_{00}}$$

Further, it is possible to calculate a moment around the gravity center by using the following formula.

$$MG_{ij} = \Sigma_{x,y}(x-x_G)^i(y-y_G)^j BW(x,y) \quad (5)$$

In above formula 5, second moments around the gravity center (three moments which are $MG_{20}$, $MG_{02}$, and $MG_{11}$) are referred to as moments of inertia. Here, a normalized moment of inertia $\mu_{ij}$ which is normalized by the 0-order moment (area of the first color region) is expressed by the following formula.

$$\mu_{20} = \frac{MG_{20}}{M_{00}} \quad (6)$$

$$\mu_{02} = \frac{MG_{02}}{M_{00}}$$

$$\mu_{11} = \frac{MG_{11}}{M_{00}}$$

Only the moment $M_{ij}$ on the right side of above-mentioned formula 6 may be expressed by the following formula.

$$\mu_{20} = \frac{MG_{20}}{M_{00}} = \frac{1}{M_{00}}\left(M_{20} - \frac{M_{10}^2}{M_{00}}\right) \quad (7)$$

Subsequently, a length a of a long axis and a length b of a short axis of an approximate pseudo elliptical shape are calculated as the following formula by using above-mentioned formula 7 so as to execute approximation to an elliptical shape of the first color region (an area is $M_{00}$).

$$a = \sqrt{2}\sqrt{\mu_{20} + \mu_{02} + \sqrt{(\mu_{20}-\mu_{02})^2 + 4\mu_{11}^2}} \quad (8)$$

$$b = \sqrt{2}\sqrt{\mu_{20} + \mu_{02} - \sqrt{(\mu_{20}-\mu_{02})^2 + 4\mu_{11}^2}}$$

It is possible to calculate an area S of the pseudo elliptical shape as the following formula by using above-mentioned formula 8.

$$S = \pi ab \quad (9)$$

In a case in which erosion does not occur in color regions which constitute a marker as illustrated in FIG. 2A, it is determined that color regions (for example, white regions) which constitute the marker have an elliptical shape, thus enabling recognition of a pair of white regions which constitute the marker. In other words, in a case in which a pair of white regions of a marker is imaged in a normally-separated state, an area of the white region is not largely different from an area of a pseudo elliptical shape. Therefore, the reduction unit 4 of FIG. 3 determines whether or not the first color region which is a processing object has an elliptical shape on the basis of whether or not a ratio (may be referred to as a first degree of similarity) between the area of the first color region which is the processing object and the area of the pseudo elliptical shape which corresponds to the region satisfies a predetermined threshold value (may be referred to as a first threshold value). The reduction unit 4 calculates an evaluation value E by using the following formula for evaluating the ratio (first degree of similarity) of areas and sets the first threshold value to 0.3, for example. In a case of E<0.3, the reduction unit 4 determines that the first color region has the elliptical shape, and in a case of E≥0.3, the reduction unit 4 determines that the first color region does not have the elliptical shape.

$$E = \frac{|S - M_{00}|}{\max(S, M_{00})} \quad (10)$$

Here, the reduction unit 4 may arbitrarily apply a reduction method and an evaluation method which are disclosed in International Publication Pamphlet No. WO 2012/061205, for example.

The calculation unit 5 of FIG. 3 is a hardware circuit based on the wired logic, for example. Further, the calculation unit 5 may be a functional module which is realized by a computer program which is executed in the image processing device 1. The calculation unit 5 accesses the reduction unit 4 so as to calculate a second degree of similarity between a first color region which satisfies above-mentioned condition of formula 10 to be determined to have an elliptical shape, in a plurality of first color regions which are included in the binarized image, and a predetermined butterfly shape. A technical purpose for calculation, which is performed by the calculation unit 5, of the second degree of similarity between a first color region which is determined to have an elliptical shape and a predetermined butterfly shape is now described. Through the verification by the inventors, it has become clear that first color regions in a pair which constitute a marker are joined with each other to form a butterfly shape when erosion occurs in color regions (for example, when lighting is strong and bright), as illustrated in FIG. 2B. Such butterfly shape may satisfy the above-mentioned condition of formula 10 and therefore, degeneration processing is not executed, causing a problem of erroneous detection in which it is difficult to specify a pair of white regions which constitute a marker. However, when determination of whether or not to be a butterfly shape is enabled in a case in which the above-mentioned condition of formula 10 is satisfied, it is possible to avoid erroneous detection and enhance robustness. Here, a method for calculation, which is performed by the calculation unit 5, of a second degree of similarity to a predetermined butterfly shape will be described later.

When the calculation unit 5 determines that first color regions which are processing objects do not form a butterfly shape, the calculation unit 5 sets the first color regions as candidates of first color regions which constitute a marker. The calculation unit 5 may access the image buffer which is included in the extraction unit 3 and copy the first color regions to the image butter so as to delete (black out) a range of first color regions of an original image. Further, when the calculation unit 5 determines that first color regions which are processing objects form a butterfly shape, the calculation unit 5 does not set the first color regions as candidates of first color regions which constitute a marker even if the first color regions have an elliptical shape. When the calculation unit 5 calculates the second degree of similarity and performs determination processing of whether or not to be a butterfly shape with respect to a plurality of first color regions, candidates of first color regions which constitute a marker are extracted in the image buffer and first color regions which are not candidates remain in an original binarized image.

After the above-described processing of the calculation unit 5 is executed, the reduction unit 4 performs degeneration processing of the original binarized image. In other words, the reduction unit 4 executes reduction processing with respect to first color regions which are determined to have no elliptical shape and first color regions which are determined to have an elliptical shape but form a butterfly shape. Here, as the degeneration processing, various techniques of related art such as a method in which pixels of outer circumference of the first color region (white region) are cut (deleted) one by one and a method in which pixels on an edge portion of the first color region are cut by predetermined filtering processing may be used. When the degeneration processing performed by the reduction unit 4 is completed, the extraction unit 3 executes labeling again with respect to a binarized image which has been subjected to the degeneration so as to extract first color regions and second color regions (in other words, white regions or black regions) again. The reduction unit 4 and the calculation unit 5 repeat the above-described series of processing until first color regions disappear. When the repetition processing is completed, candidates of first color regions which constitute a marker are extracted in the image buffer. Here, it is possible to perform processing for second color regions (black regions) as well in a similar manner to first color regions by performing black-white inverting processing, for example, so that detailed description is omitted in the following processing.

Figure 5:
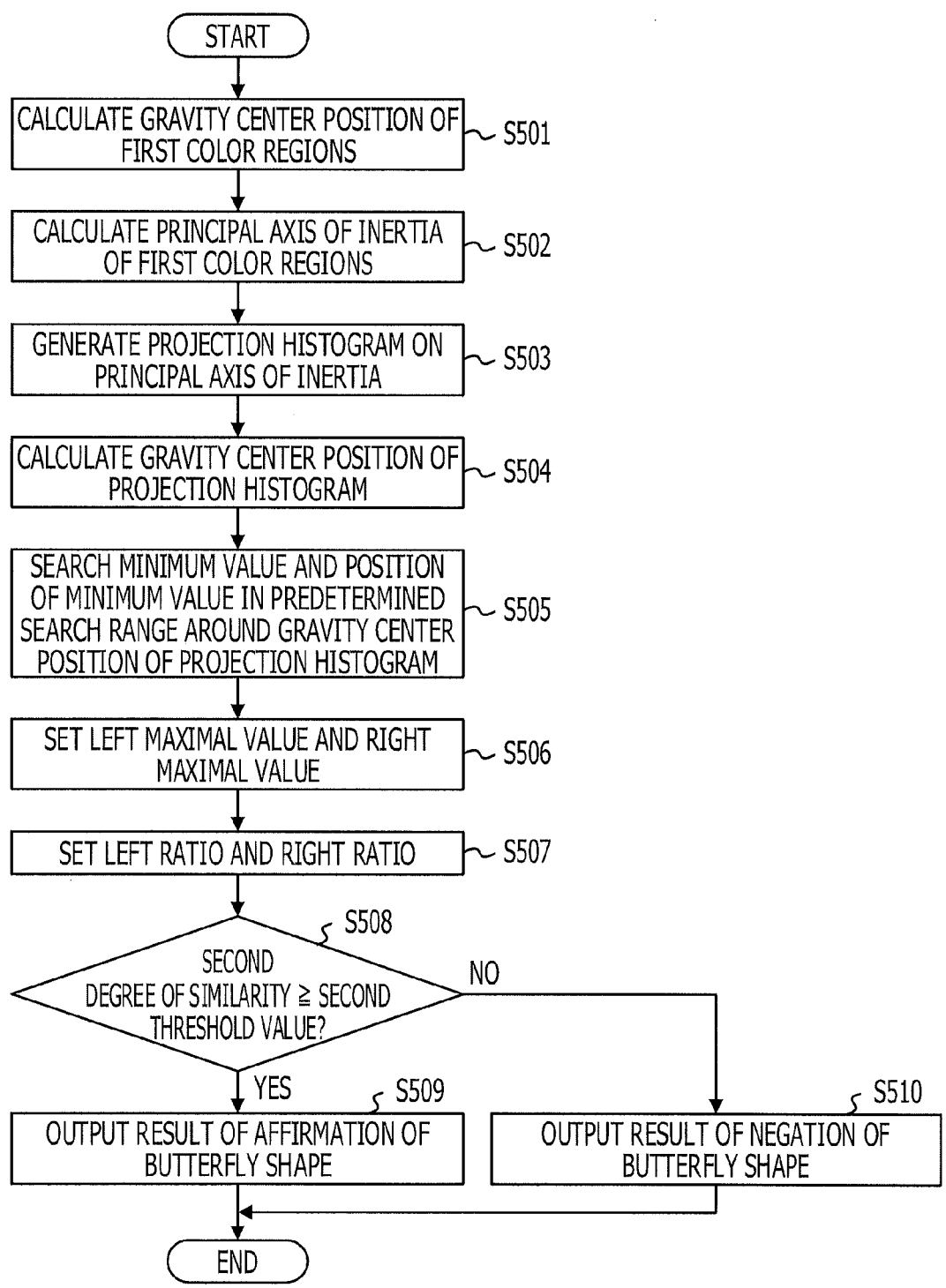
FIG. 5 is a flowchart for determining a butterfly shape by a calculation unit.

Here, a method for determination, which is performed by the calculation unit 5, of whether or not first color regions which are determined to have an elliptical shape form a predetermined butterfly shape is described. FIG. 5 is a flowchart of determination of a butterfly shape performed by the calculation unit 5. The calculation unit 5 calculates a gravity center position of first color regions by using the first color regions which is determined to have an elliptical shape, as input data (step S501). In step S501, the calculation unit 5 is capable of calculating a gravity center position of the first color regions on the basis of above-mentioned formula 4.

Subsequently, the calculation unit 5 calculates a principal axis of inertia of the first color regions which are processing objects (step S502). Here, the calculation unit 5 is capable of calculating the principal axis of inertia on the basis of the following formula.

$$\theta = \frac{1}{2}\arctan\left(\frac{2\mu_{11}}{\mu_{20} - \mu_{02}}\right) \quad (11)$$

Here, the principal axis of inertia is a straight line which passes through the gravity center position which is calculated in step S501 and has an inclination of an angle $\theta$ which is calculated on the basis of above-mentioned formula 11.

Subsequently, the calculation unit 5 generates a projection histogram with respect to the calculated principal axis of inertia in the first color regions which are processing objects (step S503). Here, the calculation unit 5 is capable of generating a projection histogram by the following procedure, for example, in step S503.

(1) An image in which first color regions which are processing objects are included is rotated by an angle $(-\theta)$, which is calculated on the basis of above-mentioned formula 11, about a gravity center coordinate $(x_G, y_G)$ which is calculated by using above-mentioned formula 4. Here, in the rotated image, a direction of the principal axis of inertia is a crosswise direction of the image (in other words, an x-axis direction).

(2) The number of pixels of the first color regions is counted in each column direction of the rotated image (a longitudinal direction, in other words, a y-axis direction). A count result of the number of pixels of each column forms a projection histogram.

Figure 6A:
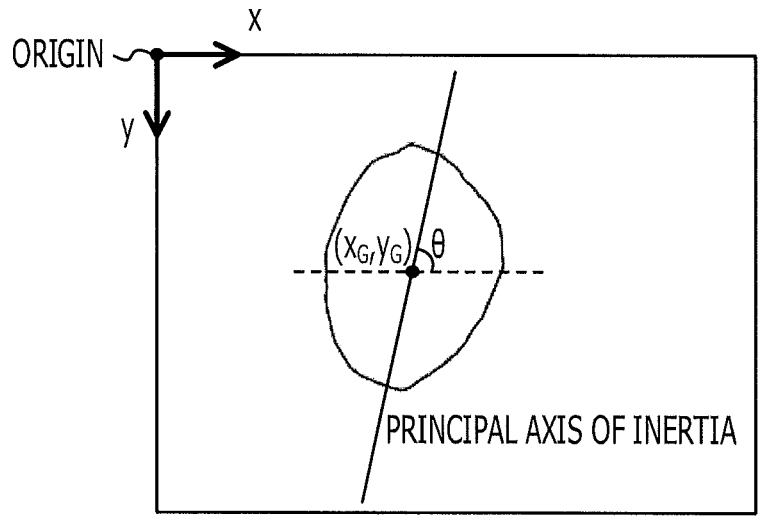
FIG. 6A illustrates an image before rotation which includes first color regions which do not form a butterfly shape.
Figure 6B:
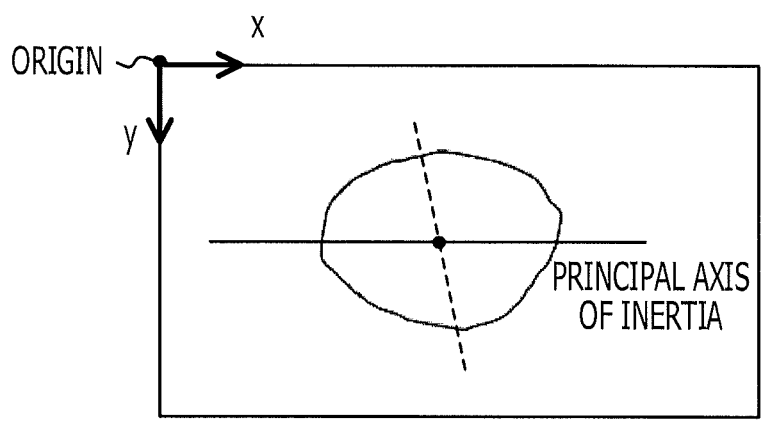
FIG. 6B illustrates an image after rotation which includes first color regions which do not form a butterfly shape.
Figure 7A:
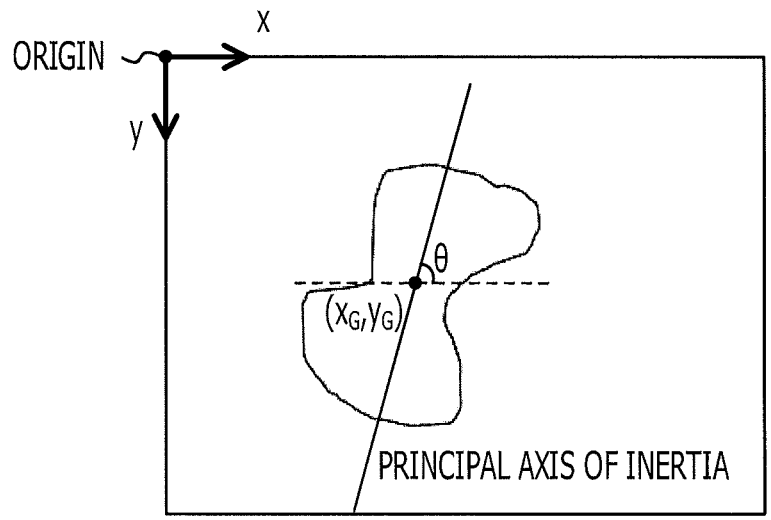
FIG. 7A illustrates an image before rotation which includes first color regions which form a butterfly shape.
Figure 7B:
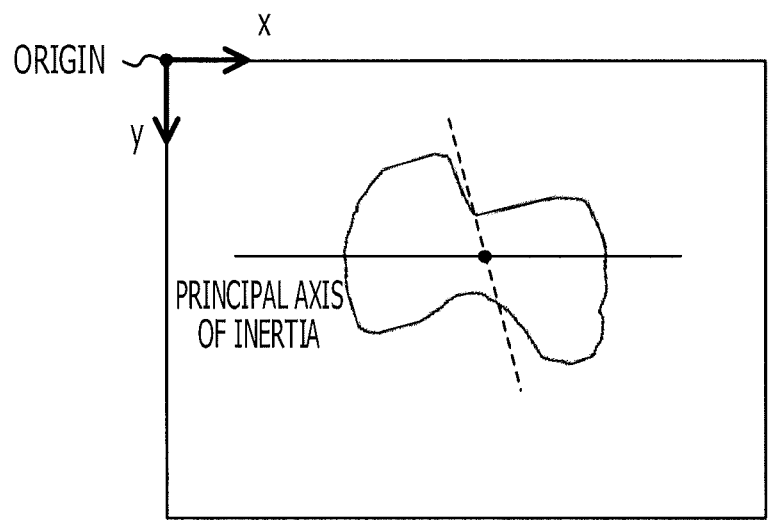
FIG. 7B illustrates an image after rotation which includes first color regions which form a butterfly shape.

FIG. 6A illustrates an image before rotation which includes first color regions which do not form a butterfly shape. FIG. 6B illustrates an image after rotation which includes first color regions which do not form a butterfly shape. FIG. 7A illustrates an image before rotation which includes first color regions which form a butterfly shape. FIG. 7B illustrates an image after rotation which includes first color regions which form a butterfly shape. As illustrated in FIG. 6A and FIG. 7A, a gravity center coordinate $(x_G, y_G)$ and a principal axis of inertia having an inclination $\theta$ are specified in the first color regions which are included in an image of which an origin is on the upper-left end. Further, as illustrated in FIG. 6B and FIG. 7B, the first color regions are rotated so that the direction of the principal axis of inertia is in a direction parallel with the x axis of the image.

Figure 6C:
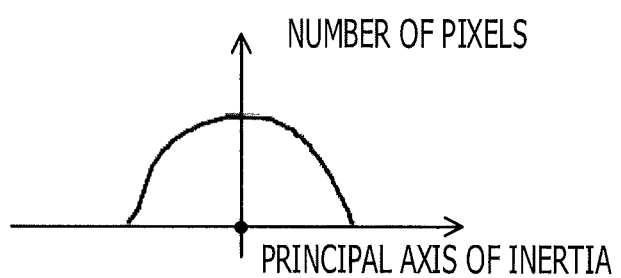
FIG. 6C is a projection histogram of first color regions which do not form a butterfly shape.
Figure 7C:
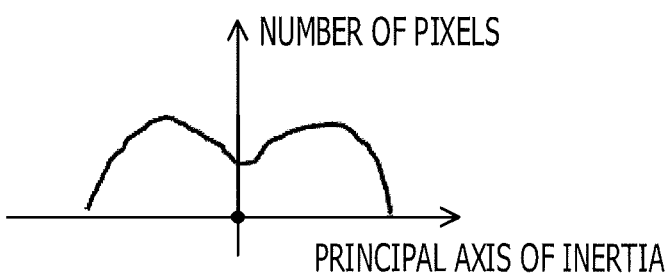
FIG. 7C is a projection histogram of first color regions which form a butterfly shape.

FIG. 6C is a projection histogram of first color regions which do not form a butterfly shape. FIG. 7C is a projection histogram of first color regions which form a butterfly shape. It is confirmable that the projection histogram illustrated in FIG. 6C has a unimodal shape and the projection histogram illustrated in FIG. 7C has bimodal-shaped multiple peaks. Accordingly, when a degree of similarity of a projection histogram with respect to a predetermined bimodal shape (may be referred to as a second degree of similarity) is equal to or higher than a predetermined degree of similarity (may be referred to as a second threshold value), the calculation unit 5 is capable of determining that the first color regions form a butterfly shape.

In FIG. 5, the calculation unit 5 calculates a gravity center position of the projection histogram which is generated in step S503 (step S504). The gravity center position may be an x coordinate of a gravity center position of the first color region of the rotated image, for example. Here, as illustrated in FIGS. 7A to 7C, when the first color regions form a butterfly shape, it is understood that a minimal value of the projection histogram exists around the gravity center position. Therefore, the calculation unit 5 subsequently searches a minimum value and a position of the minimum value in a predetermined search range around the gravity center position of the projection histogram (step S505). The predetermined search range may be set to be up to 0.6 times as large as a distance from the gravity center position of the projection histogram to a left end (or a right end), for example. This is because it is thinkable that the maximal value exists in about a half distance of the distance from the gravity center position to the left end (or the right end) when the projection histogram has a bimodal shape, and therefore, there is high possibility that a minimum value to be searched is the minimal value when 0.6 which is slightly larger than the distance is set.

After the calculation unit 5 obtains a position of the minimum value through searching from the projection histogram in step S505, the calculation unit 5 searches maximum values at the left side and the right side of the position of the minimum value so as to set the searched maximum values as a left maximal value and a right maximal value respectively (step S506). Subsequently, the calculation unit 5 calculates a ratio between the left maximal value and the minimum value which has been previously searched and a ratio between the right maximal value and the minimum value so as to set the ratios as a left ratio and a right ratio (may be referred to as second degrees of similarity) (step S507).

When the projection histogram is a butterfly shape, convex regions exist respectively on the left and the right of the searched position of the minimum value. Accordingly, the left ratio and the right ratio (second degrees of similarity) have larger values than in a case of a shape which is not a butterfly shape. Therefore, the calculation unit 5 determines whether or not both of the left ratio and the right ratio are equal to or larger than a predetermined threshold value (for example, 3.0) which is the second threshold value (step S508). When the second degrees of similarity of the first color regions which are processing objects are equal to or larger than the second threshold value (step S508—Yes), the calculation unit 5 determines that the projection histogram has bimodality and outputs a result of affirmation of a butterfly shape (step S509). Further, when the second degrees of similarity of the first color regions which are processing objects are smaller than the second threshold value (step S508—No), the calculation unit 5 determines that the projection histogram does not have bimodality and outputs a result of negation of a butterfly shape (step S510). When the processing of step S509 or S510 is completed, the calculation unit 5 ends the determination processing of a butterfly shape which is illustrated in the flowchart of FIG. 5. The calculation unit 5 outputs a processing result of the butterfly shape determination to the recognition unit 6 of FIG. 3.

The recognition unit 6 of FIG. 3 is a hardware circuit based on the wired logic, for example. Further, the recognition unit 6 may be a functional module which is realized by a computer program which is executed in the image processing device 1. The recognition unit 6 receives a processing result of the butterfly shape determination from the calculation unit 5. The recognition unit 6 recognizes first color regions or second color regions of which the second degree of similarity does not satisfy the second threshold value as first color regions or second color regions which constitute a marker, on the basis of the processing result of the butterfly shape determination. Specifically, the recognition unit 6 detects a feature point of a marker, namely, an intersecting point of a checkered pattern by using the recognized first color regions or second color regions which constitute the marker. In other words, the recognition unit 6 recognizes an intersecting point between a first line segment which couples predetermined positions of a plurality of first color regions which do not satisfy the second threshold value and are opposed to each other and a second line segment which couples predetermined positions of a plurality of second color regions which do not satisfy the second threshold value and are opposed to each other, as a feature point of a marker. Specifically, the recognition unit 6 executes the following processing, for example.

There is a case in which a plurality of candidates of color regions which constitute a marker are extracted, but first color regions and second color regions which constitute a marker have to be composed of two white regions and two black regions. Further, a line segment which is obtained by connecting gravity centers of respective white regions has to intersect with a line segment which is obtained by connecting gravity centers of respective black regions. When there are a plurality of extracted pairs of regions, the recognition unit 6 may further narrow down the number of pairs of regions. The recognition unit 6 may use an approximate size of a marker on an image and narrow down pairs of regions to pairs of regions of which a distance between gravity centers is equal to or smaller than a predetermined value (for example, the approximate size of the marker), for example. Subsequently, the recognition unit 6 performs verification processing with respect to a plurality of extracted pairs of regions. Since a shape of a marker is already recognized, a template having a marker shape is prepared and pairs of regions having similar shapes to the marker are selected on the basis of a score of template matching, for example. Here, a marker on an image may appear in a distorted manner. Therefore, it is preferable to correct distortions by performing affine transformation, for example, with respect to the image including pairs of regions so that gravity center positions of respective regions of the pair of regions are accorded with gravity center positions of respective regions of the template having the marker shape.

Through the above-described processing, the recognition unit 6 is capable of selecting region pairs of first color regions and second color regions which constitute a marker. The recognition unit 6 extracts an intersecting point of line segments which are obtained by coupling gravity centers of selected region pairs as an intersecting point of the checkered pattern and recognizes the intersecting point as a feature point of the marker.

Figure 8:
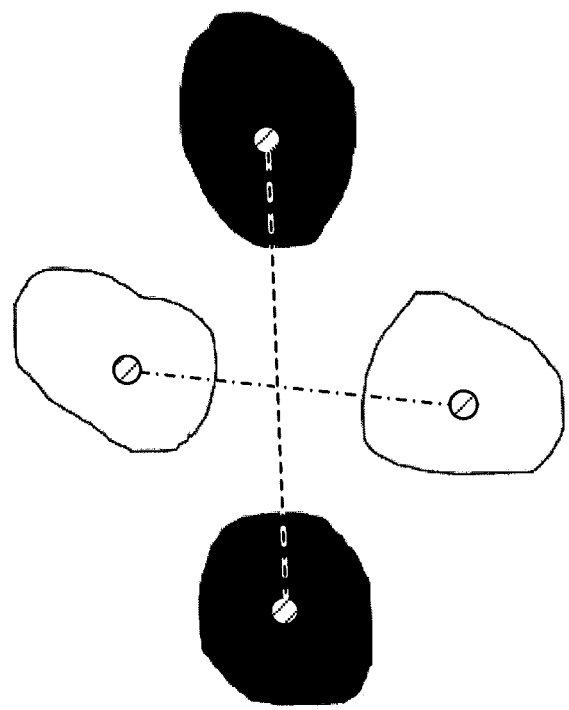
FIG. 8 is a conceptual diagram illustrating a region pair of first color regions and a region pair of second color regions which constitute a marker.

The recognition unit 6 recognizes a combination of four regions which include a white region pair and a black region pair (referred to below as region pairs) which satisfy the above-mentioned condition. FIG. 8 is a conceptual diagram of region pairs of first color regions and second color regions which constitute a marker. As illustrated in FIG. 8, the recognition unit 6 may recognize an intersecting point between a first line segment which is obtained by coupling gravity center positions of the first color regions which are opposed to each other and a second line segment which is obtained by coupling gravity center positions of the second color regions which are opposed to each other, as a feature point of a marker. Here, the recognition unit 6 may arbitrarily apply a method for determining a feature point which is disclosed in International Publication Pamphlet No. WO 2012/061205, for example.

Figure 9:
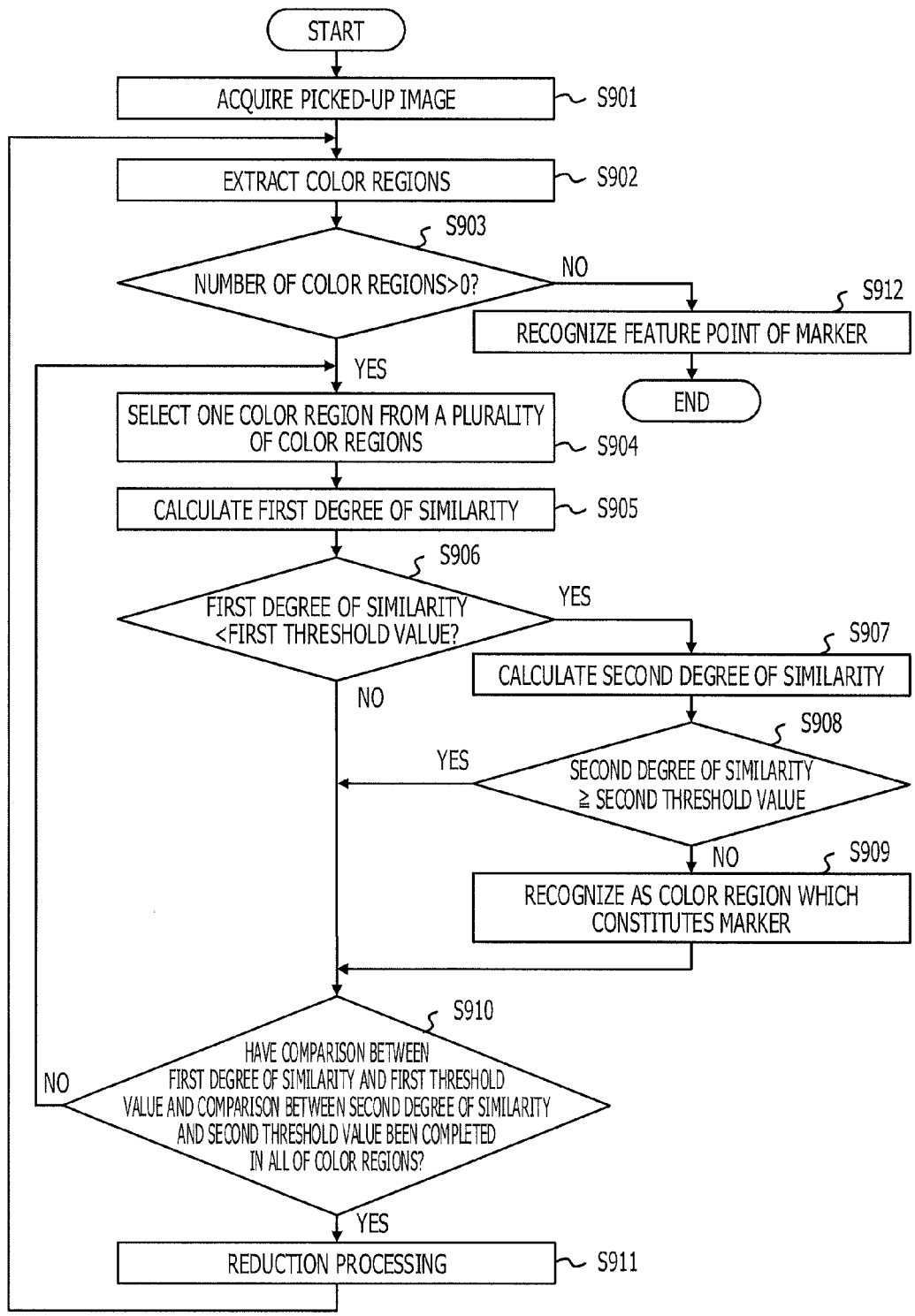
FIG. 9 is a flowchart illustrating image processing performed by the image processing device.

FIG. 9 is a flowchart of image processing performed in the image processing device 1. In FIG. 9, the acquisition unit 2 acquires a picked-up image which is imaged by an external device (step S901). The extraction unit 3 receives the image from the acquisition unit 2 and extracts first color regions and second color regions from the image by the above-described method (step S902). For the sake of convenience of the description, the first color regions and the second color regions are collectively referred to as color regions. When the number of extracted first color regions or second color regions is larger than 0 (step S903—Yes), the reduction unit 4 selects one color region from a plurality of extracted color regions (step S904). The reduction unit 4 calculates a first degree of similarity between a shape of the selected color region and a predetermined elliptical shape by using the above-described method (step S905). The reduction unit 4 compares the first degree of similarity with a first threshold value on the basis of above-mentioned formula 10, for example, so as to determine whether or not the selected color region satisfies the elliptical shape (step S906).

When the first degree of similarity is smaller than the first threshold value (step S906—Yes), the calculation unit 5 determines that the selected color region satisfies the elliptical shape and calculates a second degree of similarity by the above-described method (step S907). The calculation unit 5 determines whether or not the selected color region satisfies a butterfly shape by comparing the second degree of similarity with a second threshold value (step S908). When the second degree of similarity is smaller than the second threshold value (step S908—No), the recognition unit 6 recognizes that the selected color region does not satisfy the butterfly shape, in other words, recognizes the selected color region as a color region which constitutes a marker (step S909). Here, when the first degree of similarity is equal to or larger than the first threshold value in step S906 (step S906—No) or when the second degree of similarity is equal to or larger than the second threshold value in step S908 (step S908—Yes), the image processing device 1 determines the selected color region as a color region which does not constitute a marker and progresses the processing to step S910. The image processing device 1 determines whether or not comparison processing between the first degree of similarity and the first threshold value and comparison processing between the second degree of similarity and the second threshold value have been completed in all of the color regions which are extracted by the extraction unit 3 in step S902 (step S910). When the comparison processing has not been completed in step S910 (step S910—No), the image processing device 1 repeats the processing of steps S904 to S910.

When the comparison processing has been completed in step S910 (step S910—Yes), the reduction unit 4 executes reduction processing with respect to color regions which are determined to have no elliptical shape in step S906 or color regions which are determined to have an elliptical shape but form a butterfly shape in step S908 (step S911). When the processing of step S911 is completed, the extraction unit 3 extracts color regions again. Subsequently, the reduction unit 4 determines whether or not the number of extracted color regions is larger than 0 (step S903). Here, the reduction processing is performed in step S911, so that color regions gradually disappear. Therefore, the number of color regions becomes 0 eventually by repeating the processing of steps S902 to S911 (step S903—No).

When the number of color regions is 0 in step S903 (step S903—No), the recognition unit 6 recognizes a feature point on the basis of color regions which are recognized in step S909 and constitute a marker, by the above-described method (step S912). When the processing of step S912 is completed, the image processing device 1 completes the image processing illustrated in the flowchart of FIG. 9.

The image processing device according to embodiment 1 is capable of extracting a feature point of a marker with high accuracy in a blurred image even in a case in which white regions which constitute the marker are mutually coupled to form a butterfly shape.

(Embodiment 2)

Figure 10:
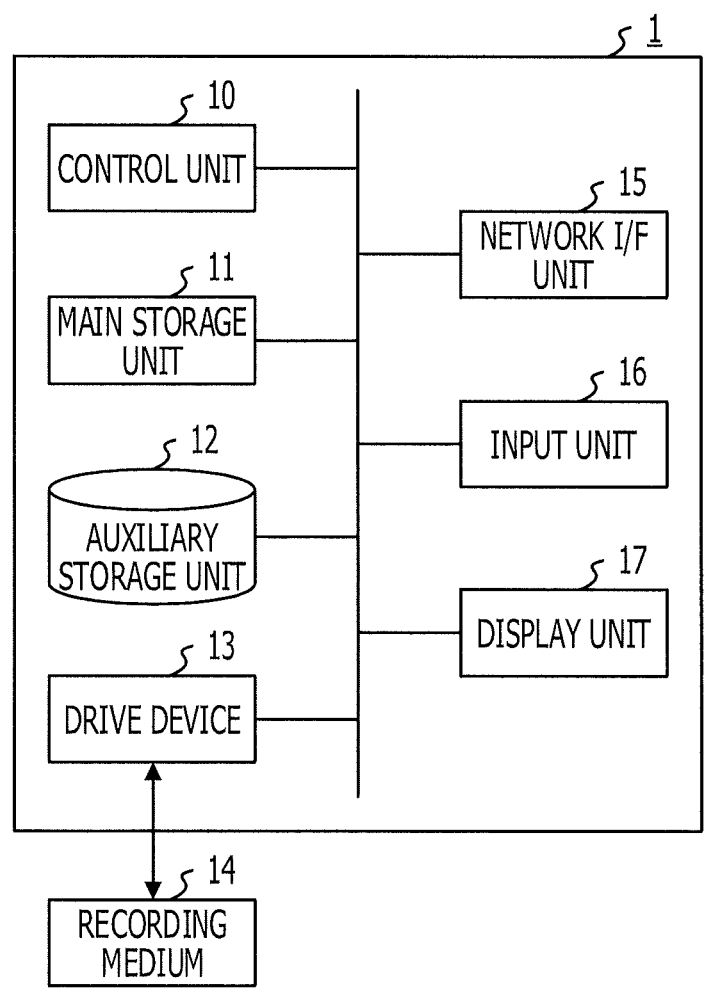
FIG. 10 is a hardware configuration diagram of an image processing device according to another embodiment.

FIG. 10 is a hardware configuration diagram of an image processing device 1 according to another embodiment. As illustrated in FIG. 10, the image processing device 1 includes a control unit 10, a main storage unit 11, an auxiliary storage unit 12, a drive device 13, a network I/F unit 15, an input unit 16, and a display unit 17. These elements are connected with each other so as to be able to mutually transmit and receive data via a bus.

The control unit 10 is a CPU which performs control of respective elements and calculation and processing of data in a computer. Further, the control unit 10 is an arithmetic device which executes a program which is stored in the main storage unit 11 and the auxiliary storage unit 12. The control unit 10 receives data from the input unit 16 and the storage device and calculates and processes the data so as to output the data to the display unit 17, the storage device, and the like.

The main storage unit 11 is a ROM or a RAM and is a storage device which stores or temporarily saves a program such as an OS which is fundamental software which is executed by the control unit 10 and application software or data.

The auxiliary storage unit 12 is an HDD or the like and is a storage device which stores data related to application software and the like.

The drive device 13 reads out a program from a recording medium 14 such as a flexible disk and installs the program on the auxiliary storage unit 12. Further, a predetermined program is stored in the recording medium 14 and the predetermined program which is stored in the recording medium 14 is installed on the image processing device 1 via the drive device 13. The predetermined program which is installed is executable by the image processing device 1.

The network I/F unit 15 is an interface between peripheral equipment, which is connected via a network, such as a local area network (LAN) and a wide area network (WAN), which is structured by a data transmission path such as a wired and/or wireless line and has a communication function, and the image processing device 1.

The input unit 16 includes a keyboard which is provided with cursor keys, digit input keys, various functional keys, and the like and a mouse, a slide pad, and the like for selecting a key on a display screen of the display unit 17, for example. Further, the input unit 16 is a user interface by which a user provides operation instruction to the control unit 10 and inputs data, for example.

The display unit 17 is composed of a cathode ray tube (CRT), a liquid crystal display (LCD), or the like and performs display corresponding to display data which is inputted from the control unit 10.

Here, the above-described image processing method may be realized as a program for being executed by a computer. This program is installed from a server or the like and executed by the computer, being able to realize the above-described image processing method.

Further, it is also possible to realize the above-described image processing by recording this program in the recording medium 14 and allowing a computer or a portable terminal to read the recording medium 14 in which this program is recorded. Here, as the recording medium 14, various types of recording media such as a recording medium which records information optically, electrically, or magnetically like a CD-ROM, a flexible disk, a magneto-optical disk, or the like and a semiconductor memory which records information electrically like a ROM, a flash memory, or the like may be used.

Further, respective elements of respective devices which are illustrated in the drawings do not have to be physically configured as illustrated. That is, specific configuration of dispersion and integration of respective devices is not limited to the illustrated configuration, and all or part of the devices may be configured in a manner to be functionally or physically dispersed and integrated in an arbitrary unit in accordance with various types of loads, usage conditions, or the like. Further, various types of processing which have been described in the above embodiments may be realized by executing a prepared program by a computer such as a personal computer and a work station.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image processing device comprising:
a processor; and
a memory which stores a plurality of instructions, which when executed by the processor, cause the processor to execute,
acquiring an image that includes a marker that includes a plurality of first color regions and a plurality of second color regions, of which a color is different from a color of the first color regions, the plurality of first color regions being opposed to each other and the plurality of second color regions being opposed to each other;
extracting the first color regions or the second color regions from the image;
reducing the first color regions or the second color regions until a first degree of similarity between a shape of the first color regions or the second color regions, the first color regions or the second color regions being extracted, and a predetermined elliptical shape satisfies a predetermined first threshold value;
calculating a second degree of similarity between the first color regions or the second color regions, the first color regions or the second color regions satisfying the first threshold value, and a predetermined butterfly shape; and
recognizing the first color regions or the second color regions of which the second degree of similarity does not satisfy a predetermined second threshold value, as the first color regions or the second color regions that constitute the marker,
wherein an intersecting point between a first line segment that couples predetermined positions of the plurality of first color regions that do not satisfy the second threshold value and are opposed to each other and a second line segment that couples predetermined positions of the plurality of second color regions that do not satisfy the second threshold value and are opposed to each other, is recognized as a feature point of the marker, in the recognizing.

2. The device according to claim 1,
wherein a principal axis of inertia of the first color regions or the second color regions, the first color regions or the second color regions satisfying the first threshold value, is calculated and a projection histogram with respect to the principal axis of inertia is generated so as to calculate a degree of similarity between the projection histogram and a predetermined bimodal shape, as the second degree of similarity, in the calculating.

3. The device according to claim 2,
wherein the first color regions or the second color regions are reduced until the first color regions or the second color regions that satisfy the second threshold value satisfy the first threshold value, in the reducing.

4. The device according to claim 1,
wherein the marker has a checkered pattern.

5. The device according to claim 1,
wherein pixels on a periphery of the first color regions or the second color regions are deleted or an edge part is filtered so as to reduce the first color regions or the second color regions, in the reducing.

6. An image processing method comprising:
acquiring an image that includes a marker that includes a plurality of first color regions and a plurality of second color regions, of which a color is different from a color of the first color regions, the plurality of first color regions being opposed to each other and the plurality of second color regions being opposed to each other;
extracting the first color regions or the second color regions from the image;
reducing, by a computer processor, the first color regions or the second color regions until a first degree of similarity between a shape of the first color regions or the second color regions, the first color regions or the second color regions being extracted, and a predetermined elliptical shape satisfies a predetermined first threshold value;
calculating a second degree of similarity between the first color regions or the second color regions, the first color regions or the second color regions satisfying the first threshold value, and a predetermined butterfly shape; and
recognizing the first color regions or the second color regions of which the second degree of similarity does not satisfy a predetermined second threshold value, as the first color regions or the second color regions that constitute the marker,
wherein a principal axis of inertia of the first color regions or the second color regions, the first color regions or the second color regions satisfying the first threshold value, is calculated and a projection histogram with respect to the principal axis of inertia is generated so as to calculate a degree of similarity between the projection histogram and a predetermined bimodal shape, as the second degree of similarity, in the calculating.

7. The method according to claim 6,
wherein the first color regions or the second color regions are reduced until the first color regions or the second color regions that satisfy the second threshold value satisfy the first threshold value, in the reducing.

8. The method according to claim 6,
wherein an intersecting point between a first line segment that couples predetermined positions of the plurality of first color regions that do not satisfy the second threshold value and are opposed to each other and a second line segment that couples predetermined positions of the plurality of second color regions that do not satisfy the second threshold value and are opposed to each other, is recognized as a feature point of the marker, in the recognizing.

9. The method according to claim 6,
wherein the marker has a checkered pattern.

10. The method according to claim 6,
wherein pixels on a periphery of the first color regions or the second color regions are deleted or an edge part is filtered so as to reduce the first color regions or the second color regions, in the reducing.

11. A non-transitory computer-readable storage medium storing an image processing program that causes a computer to execute a process comprising:
acquiring an image that includes a marker that includes a plurality of first color regions and a plurality of second color regions, of which a color is different from a color of the first color regions, the plurality of first color regions being opposed to each other and the plurality of second color regions being opposed to each other;
extracting the first color regions or the second color regions from the image;
reducing the first color regions or the second color regions until a first degree of similarity between a shape of the first color regions or the second color regions, the first color regions or the second color regions being extracted, and a predetermined elliptical shape satisfies a predetermined first threshold value;
calculating a second degree of similarity between the first color regions or the second color regions, the first color regions or the second color regions satisfying the first threshold value, and a predetermined butterfly shape; and recognizing the first color regions or the second color regions of which the second degree of similarity does not satisfy a predetermined second threshold value, as the first color regions or the second color regions that constitute the marker, wherein a principal axis of inertia of the first color regions or the second color regions, the first color regions or the second color regions satisfying the first threshold value, is calculated and a projection histogram with respect to the principal axis of inertia is generated so as to calculate a degree of similarity between the projection histogram and a predetermined bimodal shape, as the second degree of similarity, in the calculating.

* * * * *